Figure 1:
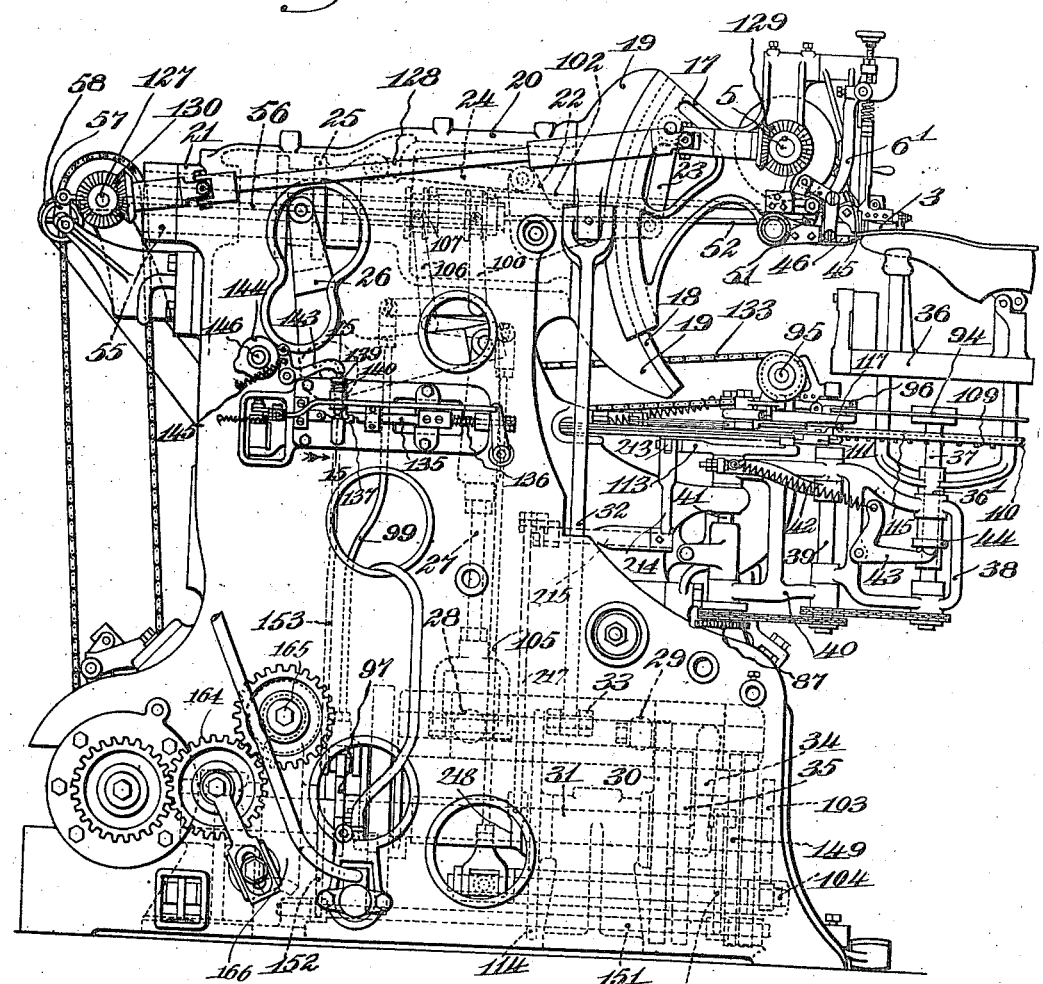

E. E. WINKLEY.
MACHINE FOR OPERATING ON SHOES.
APPLICATION FILED SEPT. 22, 1910.

1,092,619.

Patented Apr. 7, 1914.

14 SHEETS—SHEET 1.

Witnesses.
Edward S. Day
Mabel Ackroyd

Inventor
Erastus E. Winkley
by Phillips Van Everen
& Fish Atty.

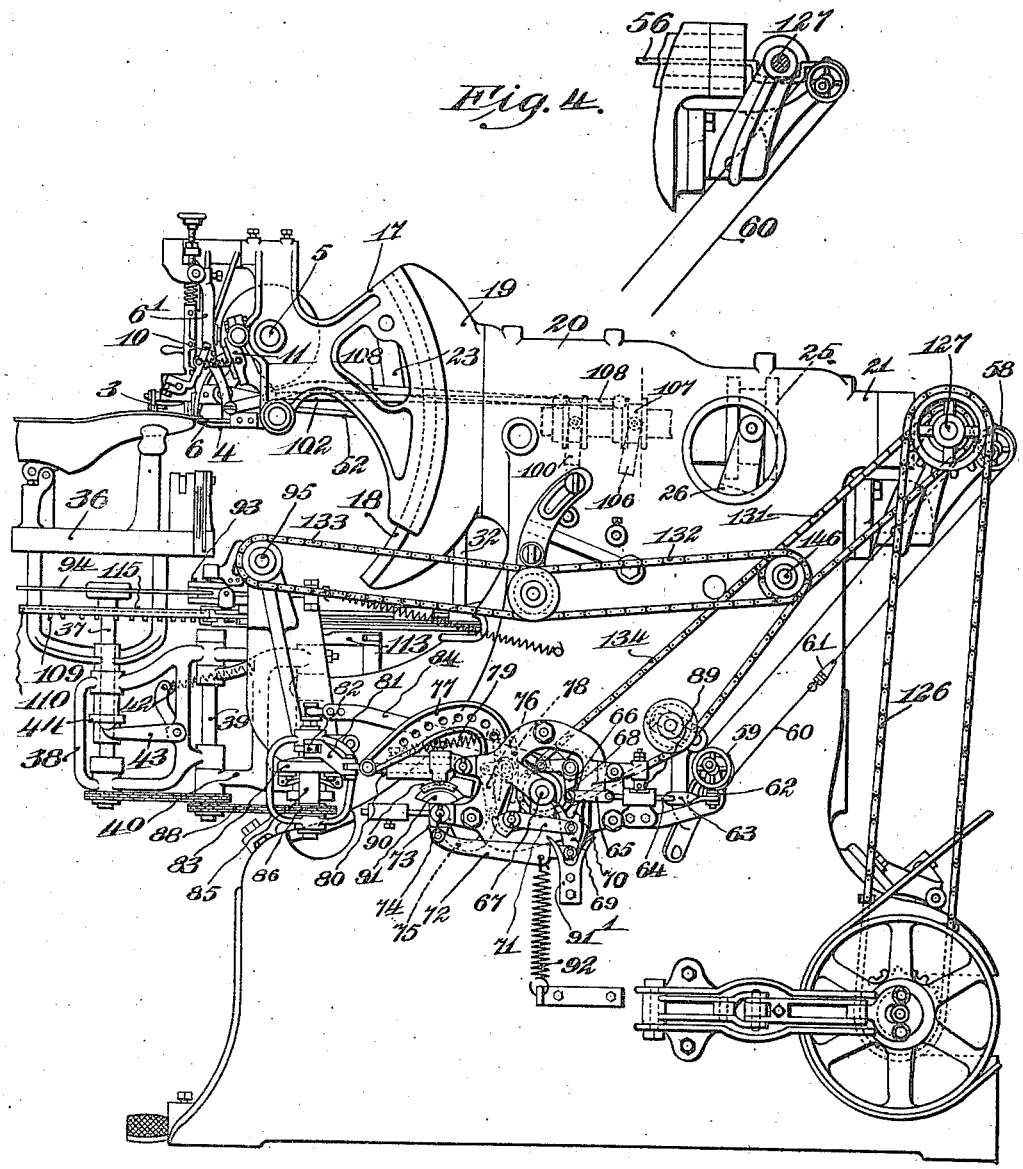

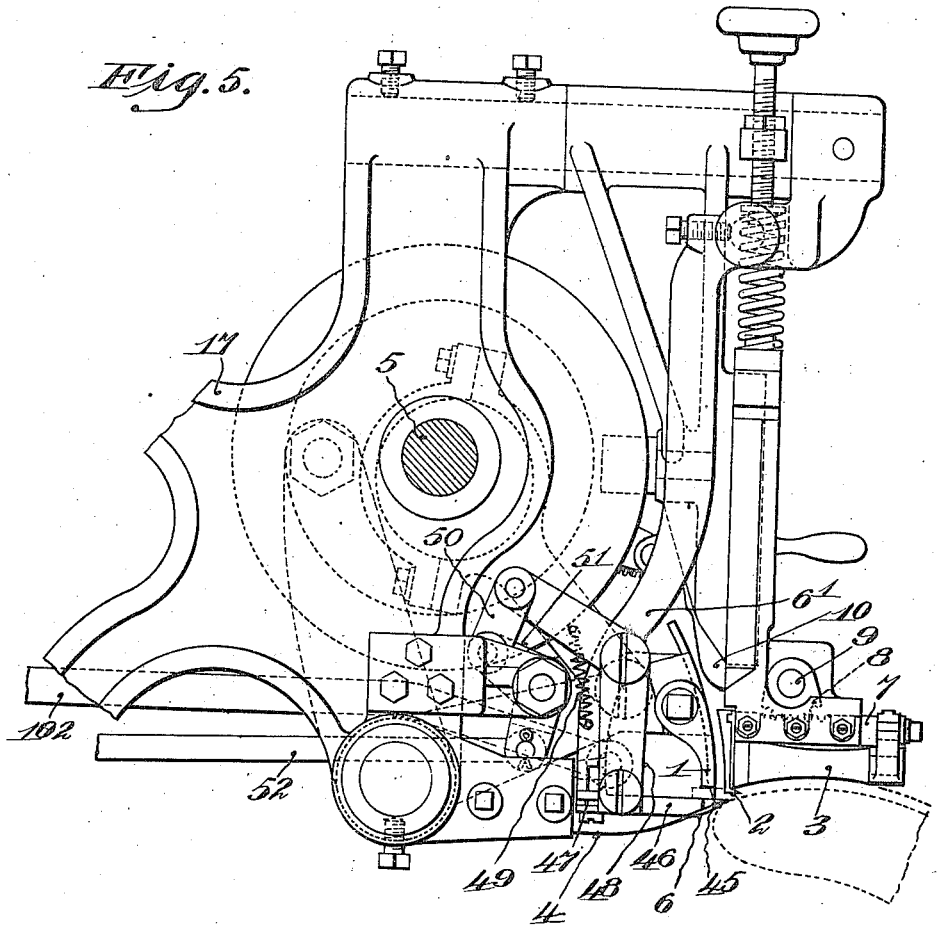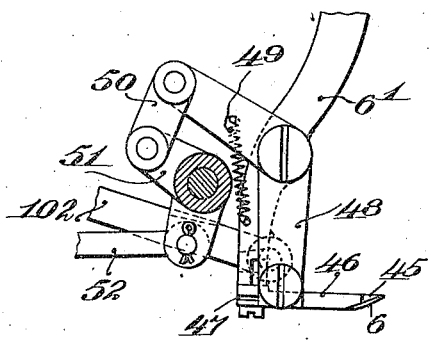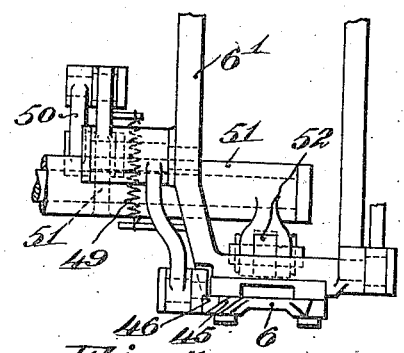

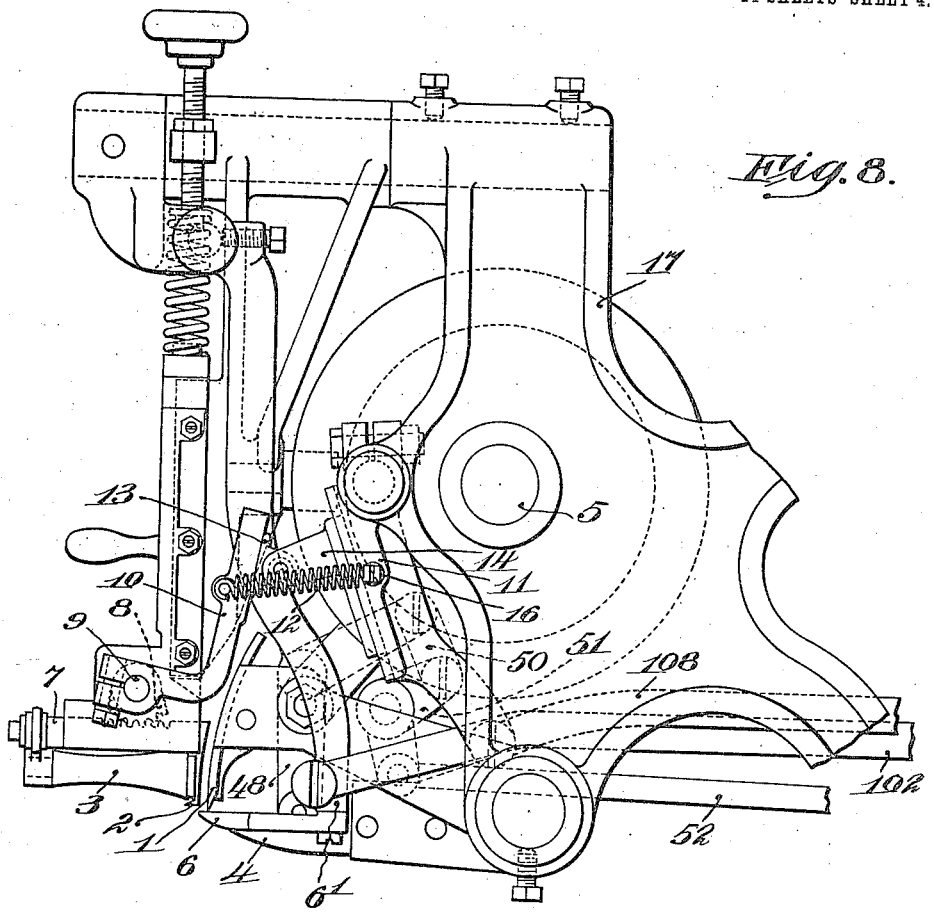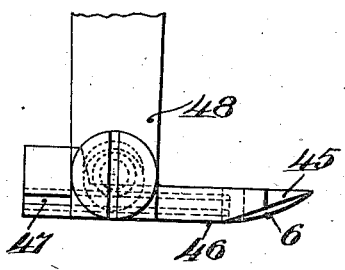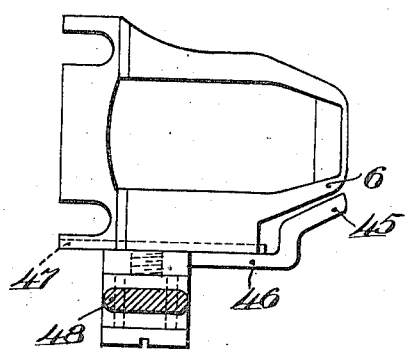

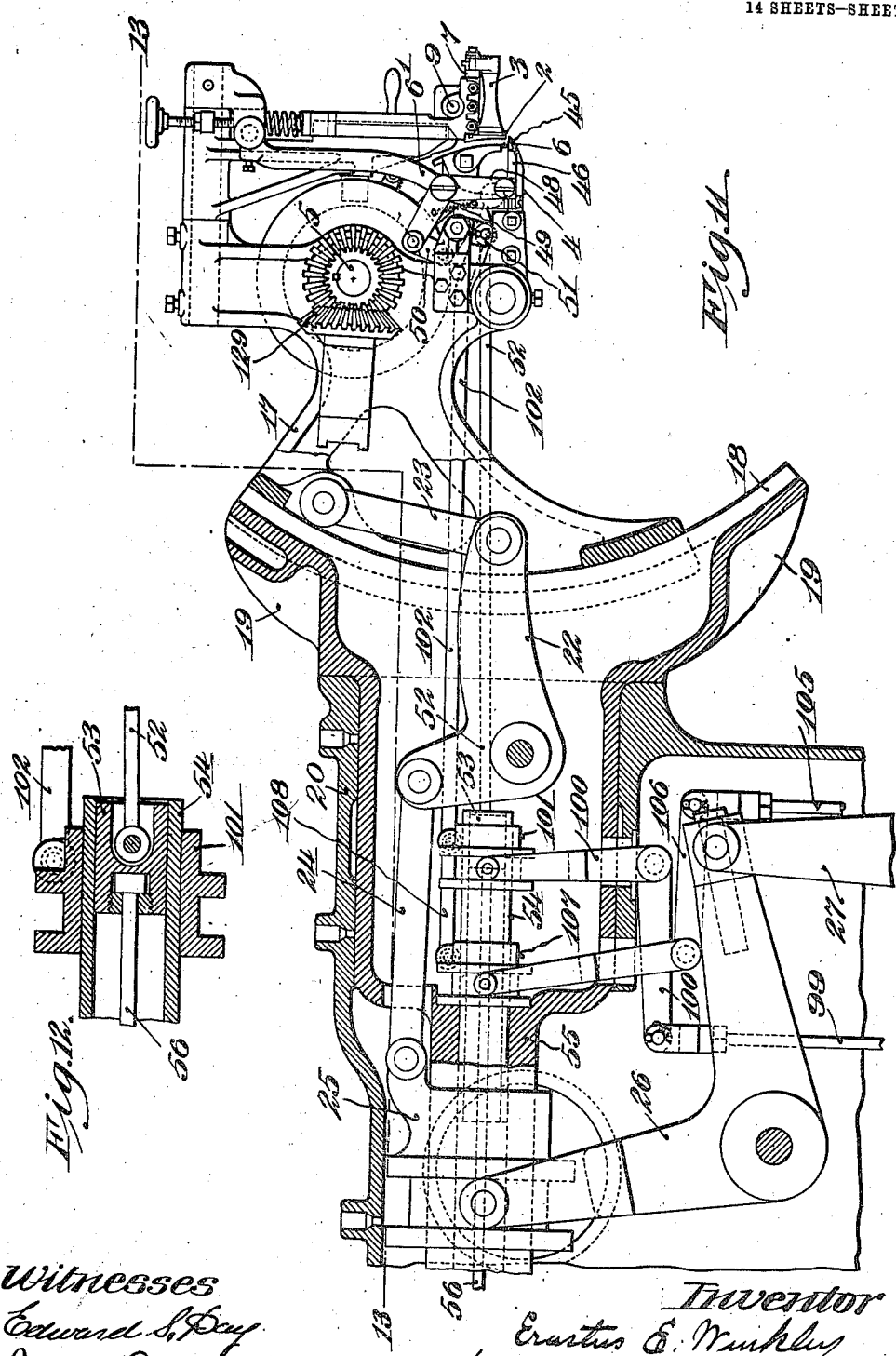

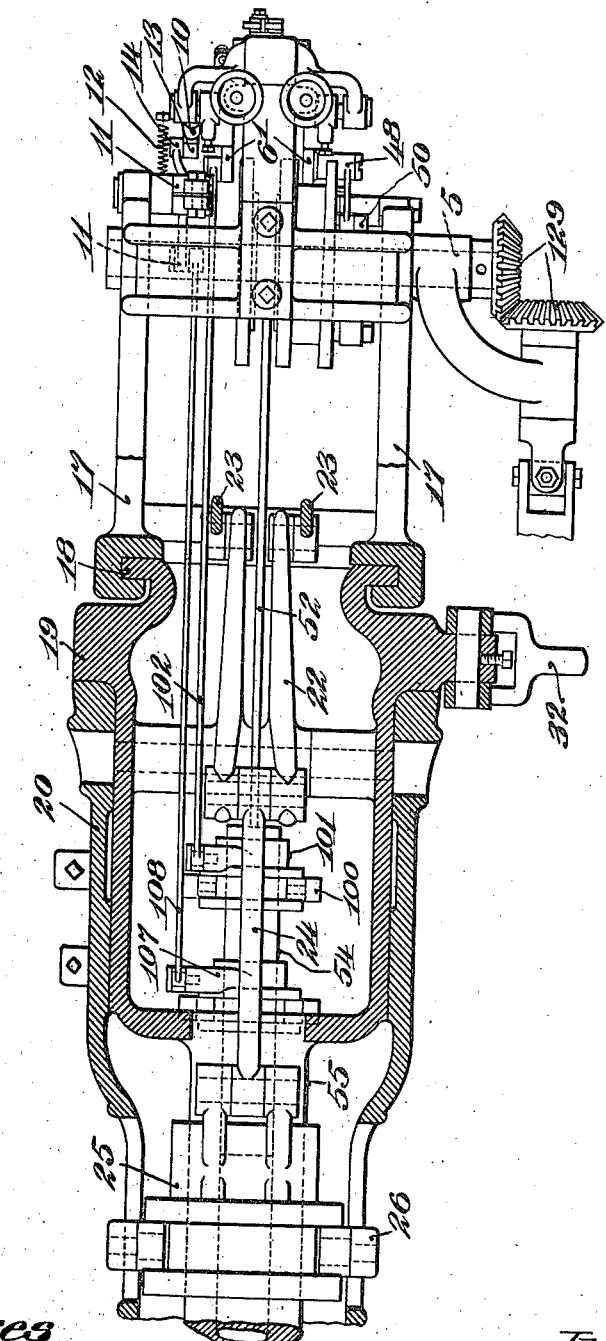

E. E. WINKLEY.
MACHINE FOR OPERATING ON SHOES.
APPLICATION FILED SEPT. 22, 1910.

1,092,619.

Patented Apr. 7, 1914.
14 SHEETS—SHEET 7.

Witnesses
Edward S. Day
Mabel Ackroyd

Inventor
Erastus E. Winkley
by Phillips Van Everen & Fish
Attys.

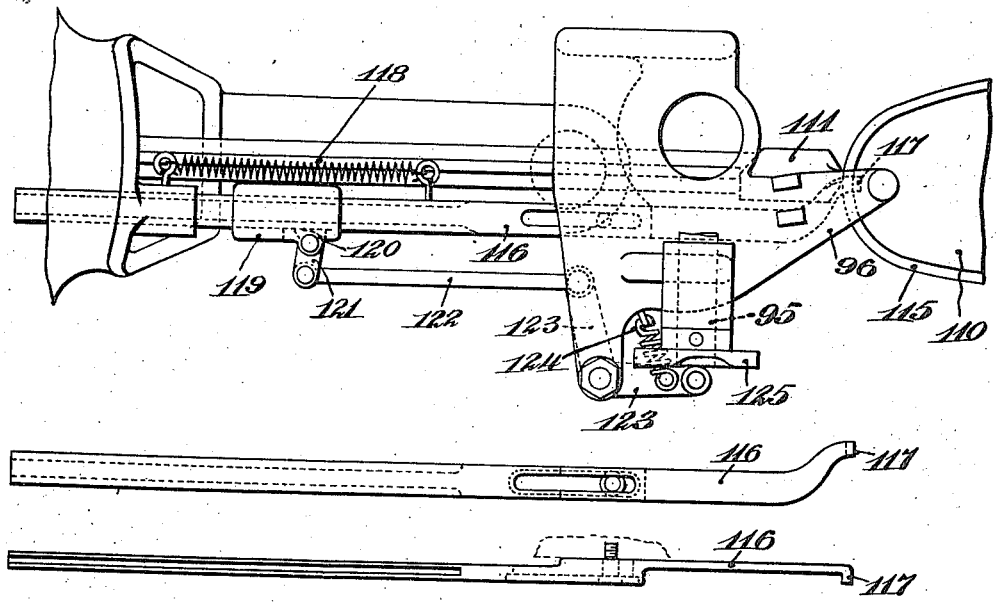
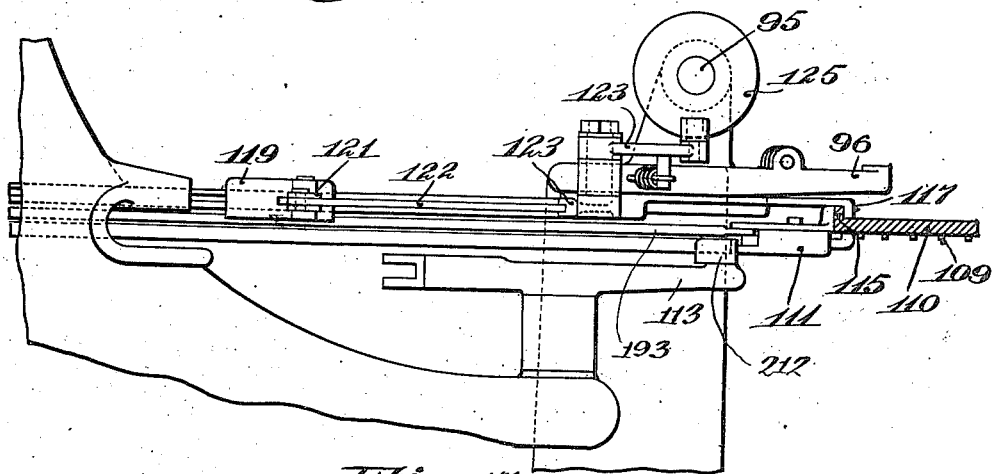

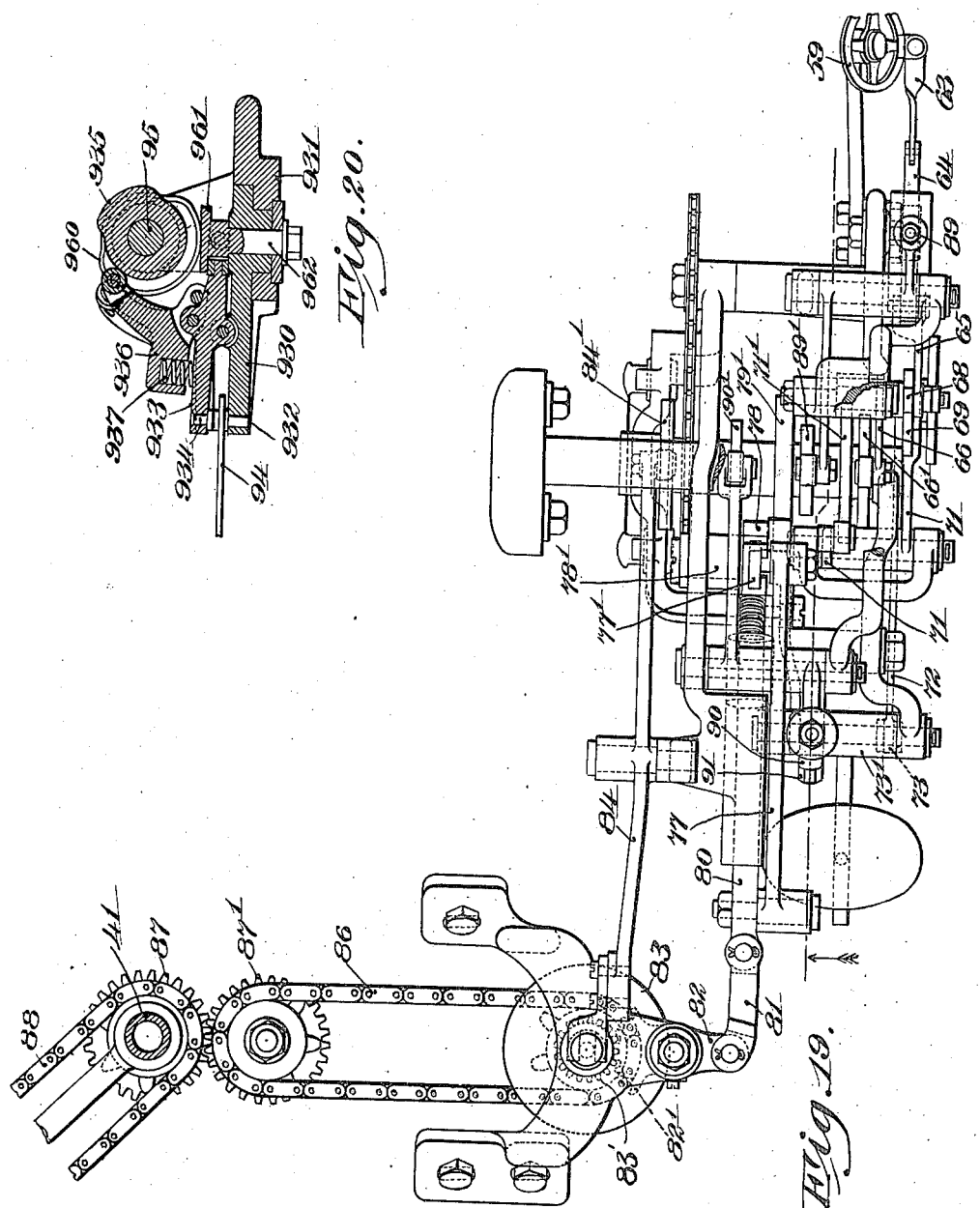

E. E. WINKLEY.
MACHINE FOR OPERATING ON SHOES.
APPLICATION FILED SEPT. 22, 1910.

1,092,619.

Patented Apr. 7, 1914.
14 SHEETS—SHEET 10.

Witnesses
Edward S. Day
N. D. McPhail

Inventor
Erastus E. Winkley
by
Phillips Van Everen & Fish
Attys

E. E. WINKLEY.
MACHINE FOR OPERATING ON SHOES.
APPLICATION FILED SEPT. 22, 1910.

1,092,619.

Patented Apr. 7, 1914.
14 SHEETS—SHEET 11.

Witnesses
Edward S. Day
H. D. McPhail

Inventor
Erastus E. Winkley
by Phillips Van Everen & Fish
Attys

E. E. WINKLEY.
MACHINE FOR OPERATING ON SHOES.
APPLICATION FILED SEPT. 22, 1910.

1,092,619.

Patented Apr. 7, 1914.
14 SHEETS—SHEET 12.

Witnesses
Edward S. Day
H. D. McPhail

Inventor
Erastus E. Winkley
by
Phillips Van Everen & Fish
Attys

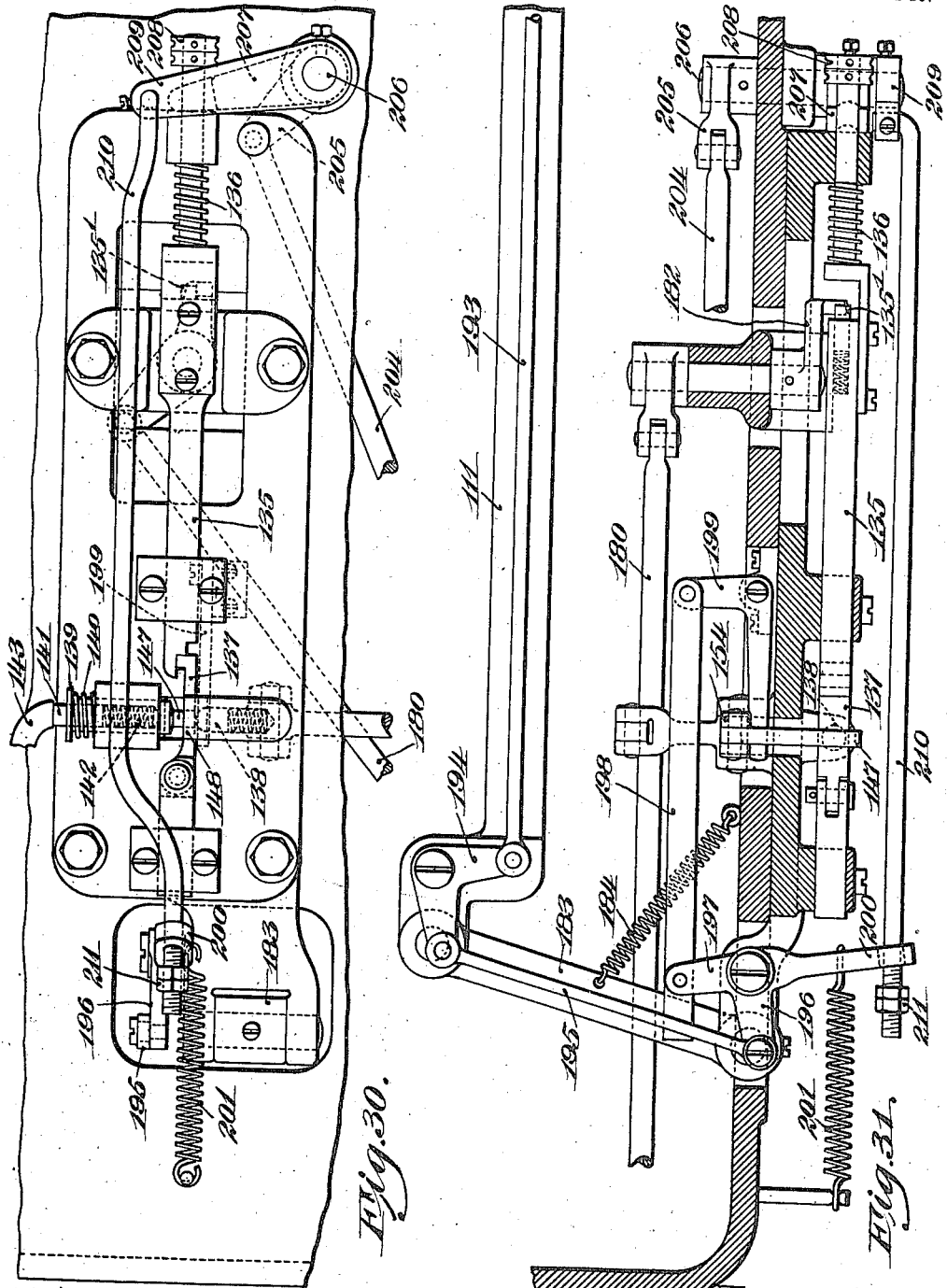

E. E. WINKLEY.
MACHINE FOR OPERATING ON SHOES.
APPLICATION FILED SEPT. 22, 1910.
1,092,619.
Patented Apr. 7, 1914.
14 SHEETS—SHEET 14.
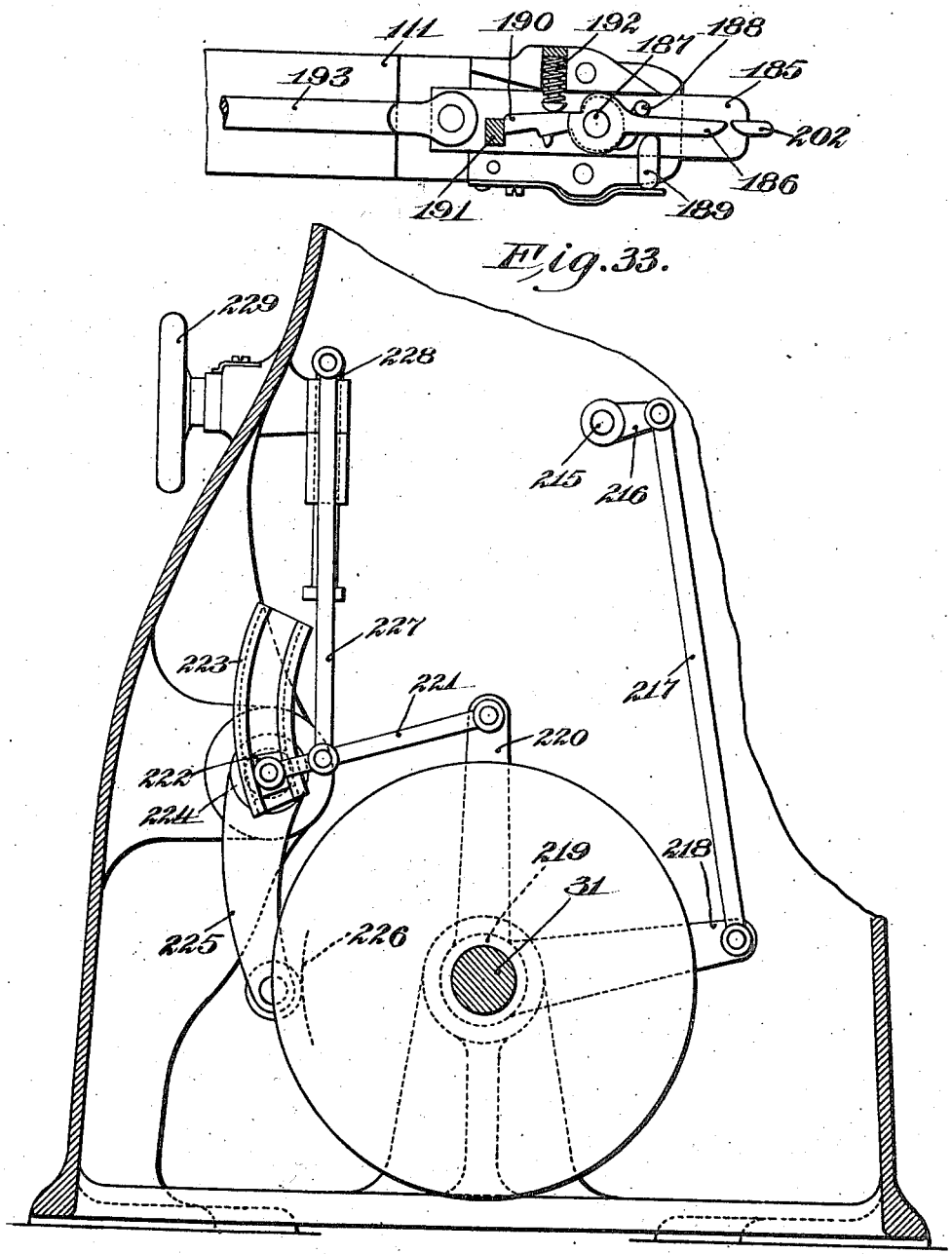

UNITED STATES PATENT OFFICE.

ERASTUS E. WINKLEY, OF LYNN, MASSACHUSETTS.

MACHINE FOR OPERATING ON SHOES.

1,092,619. Specification of Letters Patent. Patented Apr. 7, 1914.

Application filed September 22, 1910. Serial No. 583,286.

*To all whom it may concern:*

Be it known that I, ERASTUS E. WINKLEY, a citizen of the United States, residing at Lynn, in the county of Essex and State of Massachusetts, have invented certain new and useful Improvements in Machines for Operating on Shoes; and I do hereby declare the following to be a full, clear, and exact description of the invention, such as will enable others skilled in the art to which it appertains to make and use the same.

The invention relates to automatic shoe machines, and more particularly to machines for use in channeling, or rounding and channeling the sole of the shoe after the outer sole has been temporarily secured in position preparatory to permanently sewing or otherwise securing it to the shoe, although various features of the invention may be embodied in machines for performing other operations upon partially completed shoes.

The primary object of the invention is to provide a machine by which shoes may be automatically channeled or rounded and channeled without requiring the attention of the operator except to insert and remove the shoes from the machine.

A further object of the invention is to provide novel and improved mechanism for controlling the swinging movements given to the shoes, which is particularly applicable to those machines in which the distance of the point of operation from the inseam or last is varied by transverse movement of the guide against which the shoe is held.

To these ends, the invention consists in the features and combinations hereinafter described and set forth in the claims.

The various features of the invention will be understood from an inspection of the accompanying drawings and the following detailed description of the machine illustrated therein.

Figure 2:
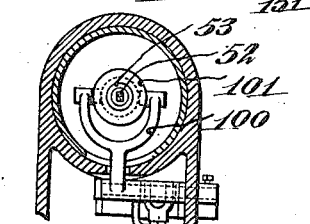
Figure 14:
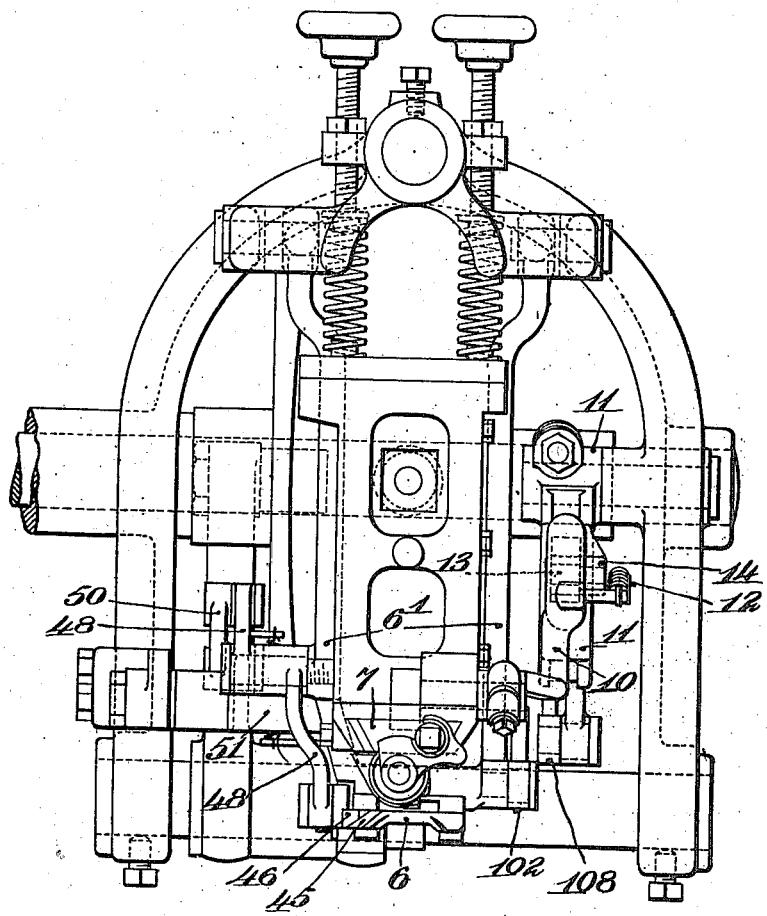
Figure 15:
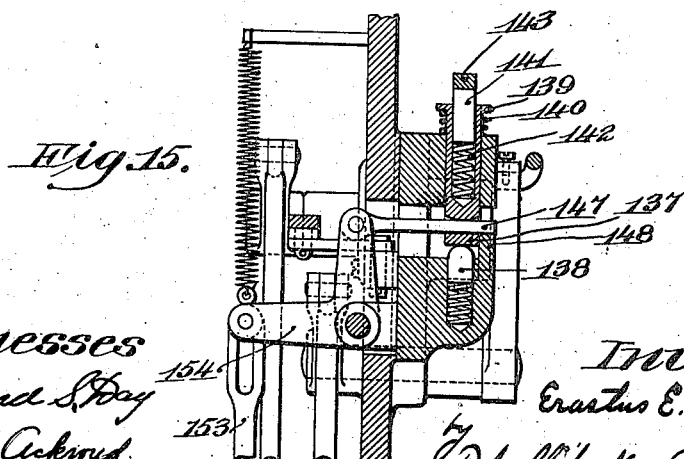
Figure 21:
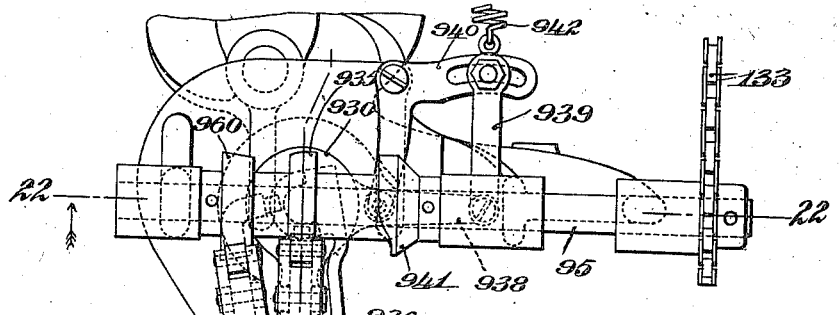
Figure 22:
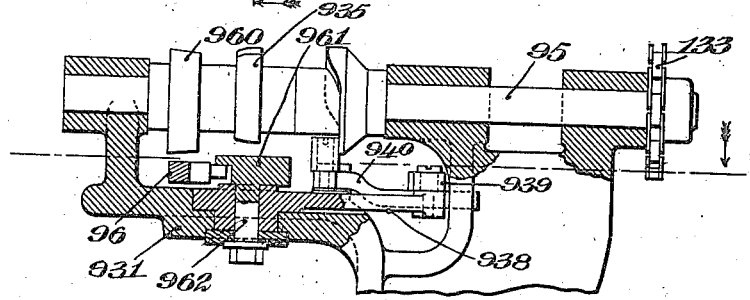
Figure 23:
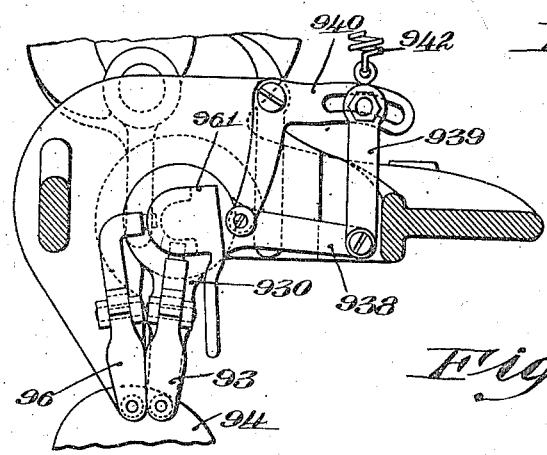
Figure 24:
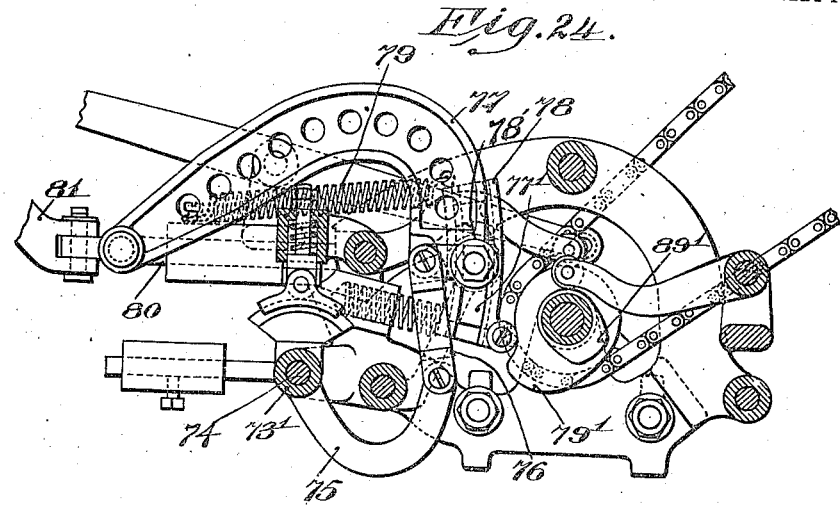
Figures 25, 26:
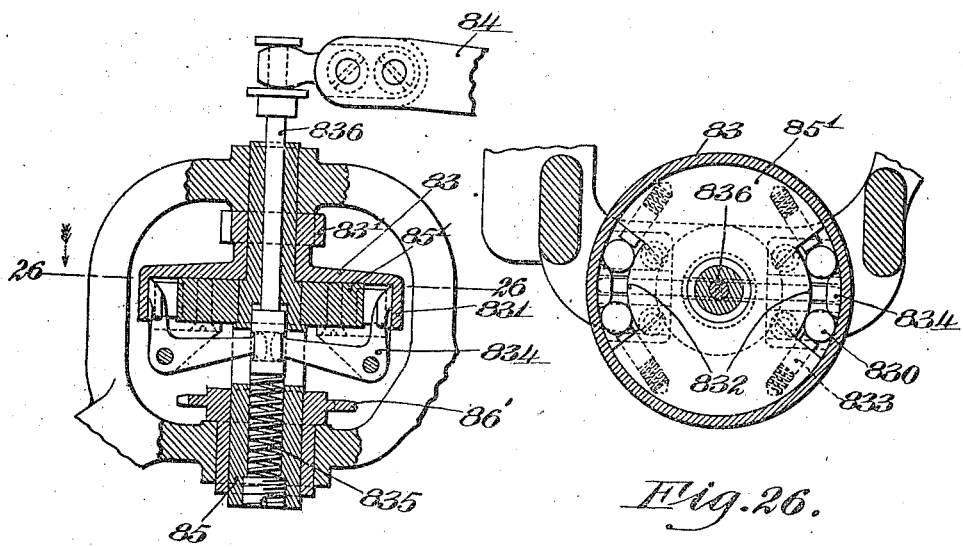
Figure 27:
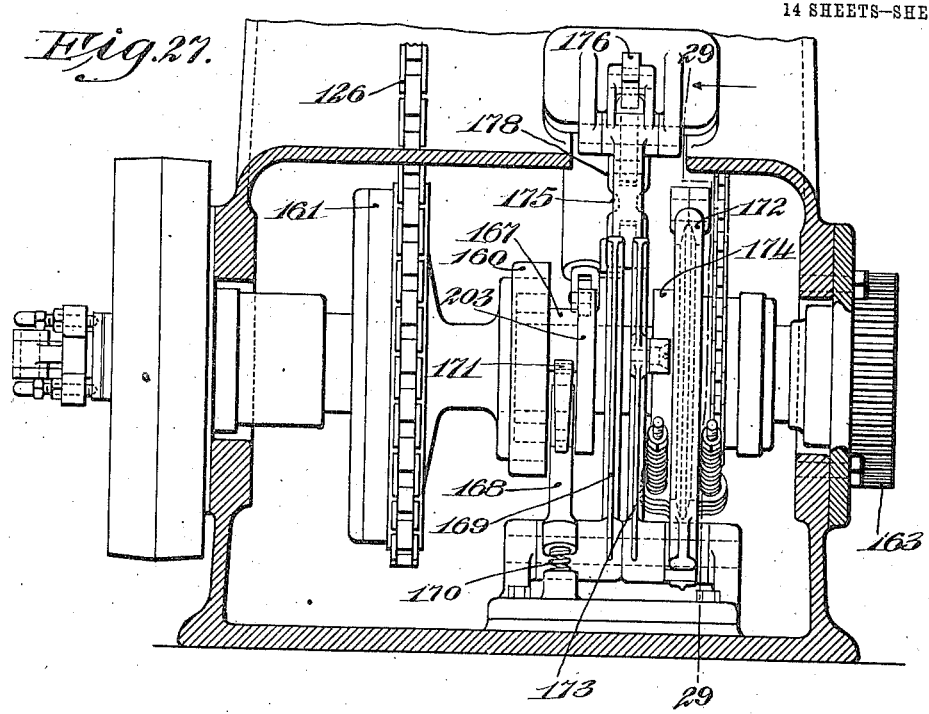
Figure 28:
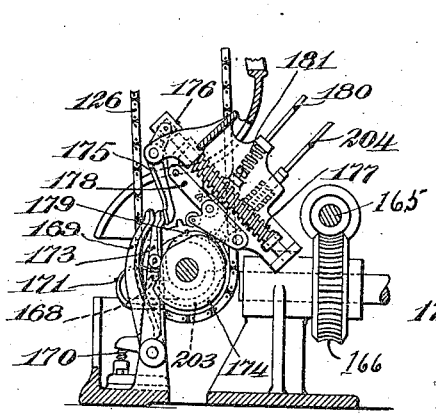
Figure 29:
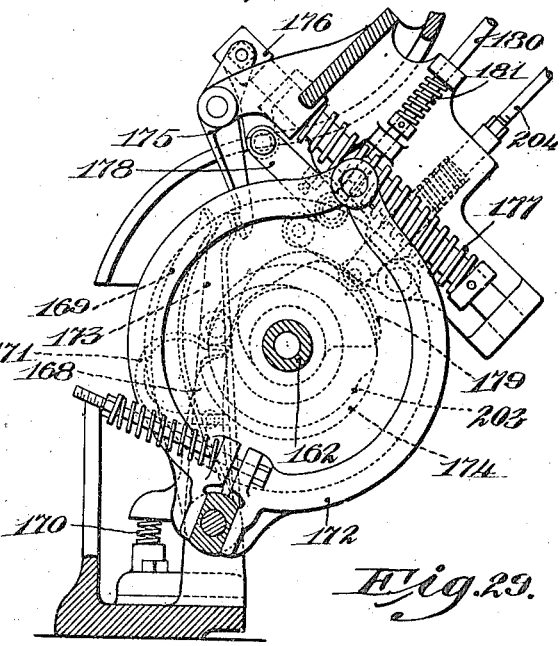

In the drawings, Figure 1 is an elevation of the lefthand side of a machine embodying the invention in its preferred form. Fig. 2 is a sectional detail showing the cams for operating the guide and the channel knife. Fig. 3 is an elevation of the right hand side of the machine. Fig. 4 is a detailed elevation of parts to be described. Fig. 5 is an elevation of the lefthand side of the channeling and rounding mechanism. Fig. 6 is a detailed elevation of the guide and the feeler finger for controlling the swinging movements of the shoe. Fig. 7 is a front elevation of the parts shown in Fig. 6. Fig. 8 is an elevation of the right hand side of the channeling and rounding mechanism. Fig. 9 is a detail of the guide and feeler finger. Fig. 10 is a plan view of the guide and feeler finger. Fig. 11 is an elevation partly in section showing the supports for the channeling and rounding mechanism and connections for operating the same. Fig. 12 is a sectional detail showing a part of the connection between the feeler finger and the mechanism controlled thereby. Fig. 13 is a horizontal sectional view on line 13—13, Fig. 11. Fig. 14 is a front elevation of the channeling and rounding mechanism. Fig. 15 is a sectional view on a larger scale taken on line 15—15, Fig. 1. Fig. 16 is a detailed plan view of the devices for holding the shoe against the guide. Fig. 17 is a side elevation of the devices shown in Fig. 16, and Fig. 18 shows a side elevation and plan of the bar for drawing the shoe against the guide. Fig. 19 is a plan view of the jack swinging mechanism on a larger scale than in Fig. 3; Fig. 20 is a sectional detail view of the auxiliary feeding gripper; Fig. 21 is a detail plan view of the auxiliary feeding gripper and pivot gripper; Fig. 22 is a sectional view on line 22, Fig. 21; Fig. 23 is a view similar to Fig. 21 with the shaft 95 and parts carried thereby removed; Fig. 24 is a detail elevation showing parts of the jack swinging mechanism; Fig. 25 is a vertical sectional view through the jack swinging clutch; Fig. 26 is a horizontal sectional view on line 26, Fig. 25; Fig. 27 is a detail rear elevation of the driving mechanism for the correcting cam shaft; Fig. 28 is a detail side elevation showing the device for controlling the operation of the correcting cam shaft; Fig. 29 is a sectional view on line 29, Fig. 27; Fig. 30 is a detail side elevation showing parts of the mechanism for controlling the operation of the correcting cam shaft; Fig. 31 is a sectional plan view of the devices shown in Fig. 30; Fig. 32 is a detail elevation showing the devices for varying the operation of the tripping devices for different sizes of shoes; and Fig. 33 is a detail view of a part of the tripping devices.

In the machine illustrated in the drawings, the means for operating on the shoe consists of sole rounding and channeling mechanism which in many respects is similar to the rounding and channeling mechanism shown and described in the patent to French and Myer No. 599,602, dated February 22, 1898. This mechanism comprises a trimming knife 1, a channeling knife 2, a sole support 3, and a four motion feed plate 4, all of which have the same construction as the corresponding parts in the machine of the above patent, and are operated in a similar manner from the cam shaft 5, Figs. 5 and 8. The guide or work support 6 is similar to the shank guide of the patent, and is adapted to enter the crease between the upper and sole. The guide acts to guide the shoe about the fore part as well as through the shank, and is automatically moved to vary the distance of the trimming knife from the inseam or last by mechanism to be described. The slide 7, which carries the channel knife and sole support is moved to vary the position of the channel knife with relation to the trimming knife by a pinion 8 secured to a rock shaft 9, as in the patent referred to. The shaft 9 carries an arm 10 which is connected with a lever 11 by a spring 12, and is engaged by a shoe 13 pivoted to an arm 14 on the lever. The arm 14 is adjustably secured on the lever 11 so that its position may be varied to vary the movement which is imparted to the channeling knife when the lever is rocked. The arm is clamped in adjusted position by means of the screw 16, to which one end of the spring is secured. The lever 11 is automatically operated at proper intervals to vary the position of the channel by mechanism which will be hereinafter described.

In general, the mode of operation of the devices thus far described, in feeding a shoe held against the guide 6 and in trimming and channeling the sole, is the same as the mode of operation of the corresponding devices in the machine of the French and Myer patent, to which reference may be had for a detailed description of their mode of operation.

The shoes to be operated upon are supported upon a jack which is automatically swung to properly guide the shoe during the channeling and rounding operation, and the devices operating upon the shoe are maintained in proper relation to the sole in operating along different parts of the shoe by tilting the support on which they are mounted, either longitudinally or transversely in accordance with the curvature of the sole at the point of operation.

The rounding and channeling mechanism is mounted upon a supporting carrier 17, which is mounted to slide on segmental ways 18 formed on a head 19, Figs. 1, 3, 11 and 13. The ways 18 are concentric with the point of operation of the rounding and channeling mechanism so that the tilting movements transversely of the feed take place about this point. The head 19 is mounted and rocked in bearings 20 and 21 formed in the frame of the machine, and the axis of these bearings is arranged to pass through the point of operation of the channeling and rounding mechanism so that the tilting movements longitudinally of the feed also take place about this point.

The support 17 is moved on the ways 18 to vary the lateral inclination of the channeling and rounding mechanism through a bell crank lever 22 mounted in the head 19 and connected at one end by a link 23 with the support, and at the other end by a link 24 with a sleeve 25, which is mounted to slide on the hollow shaft of the head 19. The collar 25 is provided with an annular groove which is engaged by pins mounted in the arms of a yoke formed on one end of a bell crank lever 26. The bell crank lever is mounted on the frame of the machine and is connected through a link 27 with an arm 28 which projects from a sleeve mounted on the frame of the machine. The sleeve is provided with a second arm 29 which carries a roll engaging a cam 30 secured to the cam shaft 31. The head 19 is rocked to vary the inclination of the channeling and rounding mechanism longitudinally of the feed through a link 32, the upper end of which is pivoted to a lug on the side of the head 19, and the lower end of which is connected to an arm 33 projecting from a sleeve which is mounted on the frame of the machine. The sleeve carries a second arm 34, the end of which is provided with a roll engaging a cam 35, which is also secured to the cam shaft 31.

The jack 36 upon which the shoe to be operated upon is supported, is secured upon a yoke formed on the upper end of a sleeve 36' which is free to slide vertically upon a shaft 37 and is connected to rotate with the shaft by the engagement of one of the arms of the yoke with a slot in one of the plates (to be described) carried by the shaft. The shaft 37 is mounted to rotate in the outer end of the supporting arm 38. The rear end of the arm 38 is mounted to turn freely on the shaft 39, which is mounted in bearings in the outer end of a second arm 40. The rear end of the arm 40 is mounted to turn freely on a shaft 41, which is mounted in fixed bearings in the frame of the machine. This construction permits the jack to be moved freely in any horizontal direction in transferring the point of operation of the channeling and rounding mechanism around the shoe. The jack is forced yieldingly upward to press the sole of the shoe against the sole support 3 during the rounding and channeling by a spring 42 connected to one end of a bell crank lever 43, the other end of which engages a collar 44 upon the jack carrying sleeve 36'. Longitudinal or feeding movements are imparted to the jack by the feed plate and sole support of the channeling and rounding mechanism and by an auxiliary feeding mechanism which will be referred to later.

Swinging movements are imparted to the shoe during the channeling and rounding so that the edge of the shoe is maintained substantially parallel with the direction of feed. In order that the shoe may be accurately swung to secure the proper guiding of the shoe during the operation of the machine, the mechanism for swinging the shoe is so controlled by the contour engaged by the guide that the shoe is swung in accordance with its longitudinal curvature at the point where it is engaged by the guide, this point corresponding to the point of operation of the channeling and rounding mechanism. The devices for thus swinging the shoe comprise a feeler 45 arranged to engage the crease or other contour of the shoe which is engaged by the guide, in advance of the point of engagement of the guide and connected to control the mechanism which imparts turning movements to the jack supporting shaft 37, Figs. 5, 10 and 14. The feeler is preferably arranged about the distance of one feeding movement of the shoe in advance of the point of operation of the channeling and rounding knives, and is mounted on or connected with the guide so that it may move with the guide when the guide is shifted transversely of the feed and may move with relation to the guide in controlling the swinging movements of the shoe. The feeler is in the form of a finger projecting from a slide 46 which is mounted to move freely in a guide way 47 formed in the side of the guide 6. The rear end of the feeler slide 46 is connected with one end of a bell crank lever 48, which is pivoted on the guide carrying arm 6' so that the lever and feeler will move transversely of the feed with the guide. The feeler is pressed yieldingly toward the shoe by a spring 49. The bell crank lever 48 is connected by a link 50 with one arm of a bell crank lever 51, which is pivoted on the support 17. The bell crank lever 51 is connected by a link 52 with a block 53 which is mounted to slide within a hollow stud 54 secured in the bore of the hollow shaft 55, forming a part of the head 19, Figs. 11 and 12. The block 53 is connected by a rod 56 with a crank arm 57 carried by a pulley 58, which is mounted beyond the rear end of the shaft 55, Fig. 1. The rod 56 has a swivel connection with the block 53, so that the connections between the feeler finger and pulley 58 do not interfere with the rocking movements of the head 19. The pulley 58 is connected to turn in unison with a second pulley 59 through a wire belt 60 which passes about the pulleys and may be tightened to take up all slack and lost motion by a turn buckle 61, Fig. 3. The pulley 59 is provided with a radially projecting arm 62 which is connected by a link 63 with one end of a slide bar 64, the other end of which is connected by a link 65 with one arm of a bell crank lever 66. The other end of the bell crank lever carries a roll engaging a cam 66' secured to a cam shaft 67 and acting to intermittently withdraw the feeler finger from engagement with the shoe so that it will not offer any resistance to the swinging movement imparted to the shoe. The bell crank lever 66 carries a roll 68, the position of which is controlled by the feeler finger 45 through the connections between the feeler and roll carrying lever. The position of the roll 68 when the feeler is in engagement with the shoe will depend upon the position of the point of engagement of the feeler with relation to the point of engagement of the guide. The position of the roll will therefore vary in accordance with the curvature of the contour along which the guide and feeler act adjacent to the point of operation of the channeling and rounding knives, and will indicate the extent and direction of the turning movement which should be imparted to the shoe to bring the point engaged by the feeler into the line of feed when it reaches the guide.

The mechanism through which the roll determines the rotary movement imparted to the jack turning shaft 37 during each cycle of operations of the rounding and channeling mechanism comprises a reciprocating controller plate 69, provided at its upper end with two oppositely inclined surfaces 70 adapted to pass on opposite sides of the roll 68 when the roll is in mid or neutral position. The plate 69 is mounted on one end of a reciprocating carrier lever 71, the other end of which carries a roll engaging a disk cam 71' secured to the cam shaft 67. The cam shaft 67 makes one revolution for each revolution of the cam shaft of the channeling and rounding mechanism so that the controller plate 69 is advanced and retracted during each cycle of operations of the channeling and rounding mechanism. The lower end of the controller plate is connected through a link 72 to an arm 73 projecting from a sleeve 73' which is loosely mounted on a shaft 74. A second arm 75 projects from the sleeve and is connected by a link 76 with an arm or link 77. The rear end of the link 77 is pivoted to a pivot block 77' mounted to slide in a segmental slot formed in an actuator lever 78 and extending on opposite sides of the pivotal axis of the lever. The actuator lever is pivotally supported in a bearing 78' and is oscillated by a cam 79' on the cam shaft 67 with which it is held in engagement by a spring 79. The other end of the link 77 is pivotally connected to a sliding bar 80, the end of which is connected by a link 81 to one arm of a clutch operating lever 82. The other end of the lever is provided with a gear segment 82' which engages a pinion 83' formed on the hub of the member 83 of a clutch through which turning movements are imparted to the jack turning shaft 37. The jack turning clutch is a double acting Horton clutch, the driven member of which consists of a disk 85' secured to a hollow shaft 85. This shaft carries a sprocket wheel 86' which is connected by a chain 86 with a similar sprocket wheel secured to a gear 87'. The gear 87', engages a gear 87 mounted on the shaft 41. Turning movements are transmitted to the shaft 39 and the jack turning shaft 37 through sprocket chains 88 which pass about sprocket wheels secured to the shafts 41, 39 and 37. The rolls 830 of the jack turning clutch are forced in a direction to wedge between the flange 831 of the driving member 83 and the clutch surfaces 832 on the driven member 85' by spring pressed pins 833, and are forced back to render the clutch inactive by bell crank levers 834. The bell crank levers are forced in a direction to release the clutch balls by a spring 835, and are actuated to render the clutch inactive through a rod 836 extending through the hollow shaft 85 and engaging the ends of the lever. The rod is actuated at proper intervals by a cam 84' secured to the cam shaft 67, and engaging one end of a lever 84, the other end of which engages the upper end of a rod 836.

So long as the point on the shoe engaged by the feeler is in the line of feed, the roll 68 will be positioned in mid or neutral position when the feeler engages the shoe. When the roll is in this position, the inclined surfaces 70 on the controller plate 69 will pass on opposite sides of the roll without effecting any swinging movement of the plate. The connections between the plate 69 and the pivot block carried by actuator lever 78 are such that under these conditions, the pivotal connection between the block and the link 77 will be in line with the axis of the actuator lever. No turning movement will therefore be imparted to the jack swinging clutch so long as the point engaged by the feeler is in the line of feed. When this point is out of line of feed, the roll 68 will be positioned either to the right or left of the neutral position, a distance proportional to the position of this point with relation to the line of feed. Now when the controller plate is raised, one of the surfaces 70 will ride against the roll and swing the plate about its pivot. This movement of the plate will, through the connections described, shift the pivot block to one side or the other of the axis of the actuating lever 78 so that during the active stroke of the lever the driving member 83 of the jack swinging clutch will operate to swing the jack and shoe through the distance requisite for bringing the point on the shoe engaged by the feeler into the line of feed.

As soon as the roll 68 has been positioned by the feeler, it is locked and held during the advance movement of the controller plate by a clamp 89 arranged to engage the sliding bar 64 and operated by a cam 89' on the shaft 67. As soon as the controller plate has been advanced and has positioned the pivot block on the actuator lever, the block is locked in position and the controller plate is retracted to free the roll 68, the clamp 89 being also released so that the feeler finger is free, and so that the roll 68 may be again positioned by the feeler. The pivot block 77' is thus locked by a clamp 90 arranged to engage a segment 91 secured to the sleeve which carries the arms 73 and 75. The clamp is operated at proper intervals by a disk cam 90' on the cam shaft 67. The controller plate and pivot block are returned to neutral position after each cycle of operations by a cam plate 91' provided with a V-shaped mouth arranged to engage a roll on the controller plate. A spring 92 is connected with the link 72 and tends to retract the controller plate.

In order to assist the feeding devices of the channeling and rounding mechanism in feeding the shoe, or to relieve them of the strain incident to overcoming the inertia and the friction of the jack supporting devices, a supplemental feeding mechanism is provided for imparting feeding movements to the jack in unison with the feeding movements of the channeling and rounding mechanism. As shown, the supplemental feeding devices consist of the feeding gripper 93 arranged to act on a plate 94 secured to the jack turning shaft 37. The feeding gripper comprises an arm 930 pivotally mounted in a bracket 931 and provided at its forward end with a freely turning stud 932 for engaging the under side of the plate 94. The movable jaw 933 of the gripper is pivoted on the plate 930, and is provided with a pivoted gripping stud 934 at its forward end. The jaw 933 is actuated to intermittently grip the plate 94 by a cam 935 arranged to engage the end of a lever 936 which is pivoted on the jaw 933 and imparts a clamping pressure to the jaw through the spring 937. The gripper is actuated to impart feeding movements to the plate 94 and connected jack through an arm 938 which projects from the hub of the arm 930 and is connected by a link 939 with one arm of a bell crank lever 940. The other arm of the bell crank lever carries a roll which is held in engagement with a cam 941 on the shaft 95 by a spring 942. The link 939 is adjustably connected to the arm of the bell crank lever 940, so that the feeding movement of the gripper may be adjusted to correspond to the feeding movement imparted to the shoe by the rounding and channeling mechanism. A gripper 96 is also provided for constraining the jack to swing about the point of operation of the channeling and rounding mechanism. This gripper is similar in construction to the feeding gripper, except that it does not have any movement in the direction of the feed. The axes of the clamping studs of this gripper are arranged in line with the point of operation of the rounding and channeling mechanism, so that when the clamp engages the plate 94 it will form a pivot about which the jack will swing when the jack turning shaft is rotated, and will constrain the jack to swing about the point of operation and will relieve the strain to which the operating mechanism would otherwise be subjected. The movable jaw of the gripper 96 is opened and closed at proper intervals by a cam 960 secured to the shaft 95.

In order that the operator may disengage both the feeding and pivot grippers from the plate 94, in case either of them are gripping the plate when it is desired to swing the jack out of position, the movable jaws of the grippers are extended rearwardly into position to be engaged by a cam 961 formed on the upper end of the stud 962, and provided with an operating handle through which it may be turned to compress the rear ends of the movable gripper jaws and thus disengage the front ends of the jaws from the plate 94.

In channeling or rounding shoes provided with Scotch or Baltimore edges, the guide 6 is moved transversely of the feed to vary its position with relation to the rounding knife and thus vary the width of the projecting edge of the sole. The position of the guide is automatically controlled to give the desired outline to the sole by a cam 97 secured to the cam shaft 31, Figs. 1 and 2. This cam is engaged by a lever 98, which is connected through a link 99 with the horizontal arm of a bell crank lever 100, Figs. 11 and 13. The vertical arm of the lever is provided with a yoke, the arms of which carry rolls engaging an annular groove in a sleeve 101. The sleeve is mounted on the stud 54, which is secured in the head 19 and is connected with the guide carrying arm 6′ by a link 102, Fig. 8.

The position of the channeling knife 2 with relation to the rounding knife is automatically controlled to determine the distance of the channel from the edge of the sole about different parts of the shoe by a cam 103 secured to the cam shaft 31, Figs. 1 and 2. This cam is engaged by a lever 104 which is connected by a link 105 with one arm of a bell crank lever 106, Figs. 11 and 13. The other arm of the bell crank lever is provided with a yoke, the arms of which carry rolls engaging an annular groove in a sleeve 107 which is mounted on the stud 54. The sleeve is connected through a link 108 with the lever 11, which is connected with the knife carrying slide 7 through the devices heretofore described, Fig. 8.

The cam shaft 31 is operated at intervals during the channeling and rounding operation to correct the position of the channeling and rounding mechanism with relation to the shoe, and to vary the position of the guide and of the channeling knife, by actuating mechanism comprising a clutch which is thrown into operation at proper times during the transfer of the point of operation about the shoe, and which, when thrown into operation, makes a single revolution and then is automatically thrown out. One member of the clutch, which is indicated at 160 (Fig. 27) is constantly driven through the main driving clutch 161, and the other member of the clutch is secured to a shaft 162 upon the end of which is secured a gear 163 connected by change gearing 164 with a shaft 165 which carries a worm engaging a worm wheel 166 secured to the shaft 31. The intermittently operating clutch 160 is a form of Horton clutch, the roll carrying ring or sleeve of which is indicated at 167. The throwing into and out of operation of the clutch is controlled by an arm 168 of a stop lever 169, which is normally held in position to engage a shoulder on the roll carrying ring by a spring 170. The stop arm 168 of the stop lever is provided with a cushioning spring 171 which is engaged by the shoulder on the roll carrying ring, and serves to cushion the blow when the clutch is thrown out of operation. A brake 172 for stopping the shaft 162 when the clutch is thrown out of operation is also provided, and this brake mechanism is operated by a brake lever 173. When the brake and stop levers are operated, the clutch 160 is thrown into operation, and after the shaft 162 has made a single revolution, the clutch is thrown out and the brake mechanism thrown in, the clutch lever having been released and returned to normal position during the rotation of the shaft, and the brake lever being released as the shaft completes its revolution. During the revolution of the shaft the brake mechanism is held out of action by a cam 174 arranged to engage a roll on the brake lever.

The mechanism for operating the brake and clutch levers to throw the correcting mechanism into operation comprises a lever 175, the lower end of which is arranged to engage the upper ends of the brake and clutch levers, and the upper end of which is pivotally connected to a sliding rod 176. The rod is acted upon by a spring 177 which tends to force the rod in a direction to operate the clutch and brake levers to throw the correcting mechanism into operation. The rod is held in normal position against the tension of the spring by a latching toggle 178 arranged to hold the lever 175 in retracted position when the links of the toggle are straightened as indicated in Fig. 28. One link of the toggle carries a roll arranged to be engaged by a resetting cam 179 during the rotation of the shaft 162. The toggle is broken to throw the correcting mechanism into operation by means of a rod 180, the lower end of which is arranged to strike the toggle. This rod is forced in a direction to break the toggle by a spring 181. The rod is held in retracted position against the tension of the spring by a latch bar 135 provided with a pin 135' which is arranged to engage one arm 182 of a bell crank lever, the other arm of which is connected to the upper end of the rod 180 (Figs. 30 and 31). The pin 135' is held in projected position by a spring, for a purpose which will be hereinafter described. The latching bar 135 is forced in a direction to disengage the pin from the arm 182, and thus release the toggle actuating rod 180, by a spring 136. The bar is held in latching position against the tension of the spring by a pivoted latching dog 137 arranged to engage a shoulder on the bar. The latching dog is held yieldingly in position to engage the shoulder by a spring pressed pin 138. The means for operating the latching dog to release the latch bar, and thus throw the driving mechanism for the cam shaft 31 into operation, comprises a vertical sliding plunger 139 which is normally supported by a light spring 140, and is provided at its upper end with a pin 141 which is supported upon a comparatively heavy spring 142 within the plunger. The upper end of the pin 141 is engaged by an arm of the bell crank lever 143 (Fig. 1), the other arm of which is held in engagement with a cam 144 by a spring 145. The cam 144 is secured to a shaft 146, which makes one revolution for each revolution of the cam shaft of the channeling and rounding mechanism, and the cam is timed to throw the actuating mechanism for the cam shaft 31 into operation at the desired point in the cycle of operations of the channeling and rounding mechanism. The disengagement of the dog 137 from the latch bar by the cam 144 at each revolution of the cam shaft, is normally prevented by a controlling slide 147 arranged to normally lie between the plunger 139 and the latching dog, and having its outer end supported upon a fixed support 148 (Fig. 15). If the end of the controller slide is supported on the support 148 when the cam 144 actuates the lever 143, the spring 142 will yield to allow the pin 141 to be depressed as the lever is rocked. If the controller plate is withdrawn so that its end is not supported upon the support 148 when the cam actuates the lever, then the plunger 139 will be depressed against the tension of the light spring 140, and will disengage the latch dog 137 from the latch bar 135.

The mechanism for withdrawing the controller slide 147 at proper intervals during the channeling and rounding operation comprises a series of trip pins 109 carried by a controller plate 110 which is secured to the jack turning shaft 37. The connections through which the tripping pins actuate the controller slide 147 comprises a bar 111 (Figs. 16 and 17) the rear end of which is pivotally supported upon a pivoted arm 183 (Fig. 31), and the front end of which is arranged to engage the end of the controller plate 110, the end of the bar being held in engagement with the plate by a spring 184 acting upon the arm 183. A slide 185 (Fig. 33) is mounted in the front end of the bar 111, and carries a latch lever 186, the front end of which is arranged in the path of the trip pins 109. The latch lever is mounted upon a pivot 187, and is held in normal position against the stop 188 by a spring pressed pin 189. The latch lever is connected to operate a detent 190, which is also pivoted on the pivot 187, and the rear end of which is arranged to engage a lug 191 on the bar 111. The detent is forced yieldingly into normal position by a spring 192. The rear end of the slide 185 is connected by a link 193 with one arm of a bell crank lever 194 (Fig. 31) which is mounted upon the bar 111 and the other end of which is connected by a link 195 with one arm 196 of a 3-arm lever. A second arm 197 of the 3-arm lever is connected by a link 198 with one arm of a bell crank lever 199, the other arm of which is arranged to engage and operate the bell crank lever 154 to which the controller plate 147 is pivoted (Fig. 15). The third arm 200 of the 3-arm lever is acted upon by a spring 201 which tends to swing the lever in a direction to retract the slide 185 at the end of the bar 111, and also to withdraw the controller plate 147 from engagement with its support 148. The parts are held in normal position against the tension of the spring 201 by the engagement of the detent 190 on the plate 185 with the lug 191 on the bar 111. When one of the trip pins strikes the latch lever 186 during the feed of the jack and shoe, the detent 190 is disengaged from the lug 191, so that the spring 201 operates to withdraw the controlling plate 147 from engagement with its support 148, and also acts to retract the slide 185. When this occurs, the plunger 139 is operated at the proper time during the cycle of operations performed by the rounding and channeling mechanism to throw the driving mechanism for the shaft 31 into operation. The rearward movement of the slide 185 brings a finger 202 on the front end of the slide into the path of the trip pins 109, so that the passage of a second trip pin past the latch lever 186 is prevented until the parts are reset or returned to normal position. Whenever the controlling devices are operated to throw the driving mechanism for the shaft 37 into operation, they are reset before the next succeeding feed of the shoe takes place.

The resetting mechanism comprises a cam 203 (Fig. 29) carried by the shaft 162, and arranged to engage a roll carried upon the lower end of a rod 204. The upper end of the rod is connected to an arm 205 (Figs. 30 and 31) which is secured to a rock shaft 206. This shaft carries a second arm 207, the upper end of which is arranged to engage an adjustable collar 208 secured to the end of the latching bar 135. The rock shaft also carries a third arm 209, the upper end of which is connected with one end of a rod 210. The other end of the rod passes through a hole in the arm 200 of the 3-arm lever above described, and is provided beyond the arm with adjustable nuts 211 engaging the arm.

During the rotation of the shaft 162 after the driving clutch 160 has been thrown into operation, the resetting cam 203 operates the rod 204 to rock the shaft 206. During this rocking movement the arm 207, acting against the collar 208, retracts the latching bar 135 against the tension of the spring 136, so that the latching dog 137 may re-engage the shoulder on the bar. This movement of the rock shaft takes place before the clutch controlling toggle 178 is reset, and the end of the lever 182 is in front of the end of the pin 135'. For this reason the pin is spring supported, so that it may yield as the latching bar 135 is reset. After the latching bar is reset, and when the toggle 178 is straightened, the arm 182 moves down below the pin 135', so that the pin snaps forward over the end of the arm, thus latching the toggle operating rod 180 in retracted position.

The rocking movement of the rock shaft 206 also operates the rod 210 to swing the 3-arm lever against the tension of the spring 201, so that the bell crank lever 199, and the slide 185 in the front end of the bar 111, are returned to normal position. As the slide is thus returned to normal position, the detent 190 snaps into position in front of the lug 191, so that the parts are locked in position against the tension of the spring 201. Before the shaft 162 completes its revolution, the resetting cam 203 releases the rod 204, so that the rock shaft 206 returns to normal position.

In order that the same controller plate 110, and the same arrangement of pins 109, may be utilized in operating upon different sizes of shoes of the same style, means is provided for moving the front end of the bar 111 in the direction of the feed of the jack, and for varying the extent of this movement in accordance with the size of the shoe to be operated upon. For this purpose the front end of the bar 111 is supported in a guide block 212 (Fig. 17) which is pivotally mounted on the end of a lever 113. The rear end of the lever is connected by a link 213 (Fig. 1) with the upper end of an arm 214 secured to a rock shaft 215. The rock shaft carries a second arm 216 (Fig. 32) which is connected by a link 217 with an arm 218 projecting from a sleeve 219 which is loosely mounted on the shaft 31. The sleeve is provided with a second arm 220, the upper end of which is pivotally connected to one end of a link 221. The other end of the link is pivotally connected to a slide 222 mounted in a slot formed in an arm 223 which projects from a rock sleeve 224. The rock sleeve is provided with a second arm 225, the lower end of which carries a roll arranged to engage a cam 226 secured to the shaft 31. The link 221 is connected by a rod 227 with a vertically adjustable slide 228. The slide is provided with a rack engaged by a pinion connected with the hand wheel 229. By these connections the tripping devices carried by the front end of the bar 111 may be moved by the cam 226 in the direction of the travel of the trip pins, so that the effect is the same as if the distance between the pins were varied, while the arrangement of the pins remains the same. By adjusting the end of the link 221 in the arm 223, the extent to which the latching devices are moved may be varied in accordance with the size of the shoe to be operated upon, no movement being imparted to the latching devices when the pivotal connection between the link and arm 223 is in line with the axis of the sleeve 224.

In operating along certain parts of the shoe, as for instance, in passing from the shank to the fore part and from the fore part to the shank, it may be desirable to advance the cam shaft 31 during each cycle of operations of the channeling and rounding mechanism so that the width of the projecting edge of the sole may be rapidly varied at these points. In the construction shown the means for thus withdrawing the controller plate 147 comprises a cam 149 secured to the cam shaft 31 and arranged to operate upon a roll carried by the upper end of an arm 150 which is secured to a rock shaft 151. The rock shaft carries a second arm 152 which is connected by means of a link 153 with the bell crank lever 154 by which the rear end of the controller plate is pivotally supported. The upper end of the link 153 is connected with the bell crank lever 154 (Fig. 15) by means of a slot engaging a pin on the bell crank lever so that the operation of the lever by the devices which are operated by the trip pins 109 is not interfered with.

In order to insure the accurate guiding of the shoe during the channeling and rounding and to avoid any tendency for the shoe to swing away from the guide, means is provided for drawing the shoe against the guide. Since the provision of this means might interfere to some extent with the feed and with the free swinging movement of the jack in correcting the position of the shoe, the devices for drawing the shoe against the guide are preferably so constructed and actuated that the pressure tending to draw the shoe against the guide is relieved during the swinging of the jack. In the construction shown, the devices for drawing the shoe against the guide 6 comprise a marginal flange 115 formed on the plate 110, and a sliding bar 116 provided at its forward end with a depending lug or finger 117 adapted to engage the inner surface of the flange, Figs. 1, 16 and 18. The bar is arranged to engage the flange substantially in a line with the guide 6, and is held continually in engagement with the flange by a light spring 118. While the light spring 118 holds the bar continually in engagement with the flange 18, it does not offer any material resistance to the forward movement of the bar in accommodating itself to the movement of the flange 115 during the swinging of the jack and shoe, and also allows the bar to accommodate itself to any variations in the position of the flange. During each cycle of operations, the bar 116 is drawn forcibly against the flange 115 to draw the shoe firmly against the guide 6. The devices for thus actuating the bar comprise a clutch sleeve 119 mounted to slide on the bar and carrying a clutch pawl 120. The clutch pawl is formed on the inner end of a lever 121, the other end of which is connected by a link 122 with a bell crank lever 123. The bell crank lever is acted upon by a spring 124, which tends to move the lever in a direction to force the clutch pawl against the bar 116 and move the bar in a rearward direction. The bell crank lever is moved against the tension of the spring 124 to disengage the clutch pawl from the bar 116 by a cam 125 secured to the end of the cam shaft 95. During such cycle of operations of the channeling and rounding mechanism, the cam 125 releases the lever 123 so that the spring 124 will act to engage the clutch pawl with the bar 117 and thus force the bar firmly against the flange 115 on the plate 110, thus drawing the shoe firmly against the guide 6. The cam then rocks the lever to release the pawl 120 so that the bar is held merely by the light spring during the feed and during the swinging of the shoe.

The various mechanisms of the machine are driven from a main driving shaft which is connected through a chain 126 with a shaft 127 (Figs. 1 and 3). The cam shaft 5 of the channeling and rounding mechanism is driven from the shaft 127 through a telescope shaft 128 which is connected by universal joints with two short shafts, one of which is connected by bevel gearing 129 with the cam shaft 5, and the other of which is connected by bevel gearing 130 with the shaft 127. The cam shaft 146 is driven from the shaft 127 through the chain 131. The cam shaft 95 is driven from the shaft 146 through the chains 132 and 133, and the cam shaft 67 is driven from the shaft 146 through the chain 134. These driving connections are so proportioned that the cam shafts 146, 95 and 67 each make one revolution for each revolution of the cam shaft 5 of the channeling and rounding mechanism.

While the invention has been illustrated and explained in connection with its application to a machine for channeling or channeling and rounding shoes, and certain features of the invention relate more particularly to such a machine, it will be understood that some of the features of the invention may be embodied in machines for performing other operations upon a shoe. It will also be understood that the specific construction and arrangement of the parts is not material to the broader features of the invention and may be varied and modified without departing from the invention.

Having explained the nature and object of the invention and specifically described one form of machine in which it may be embodied, what I claim is:—

1. A machine for operating upon shoes, having, in combination, means for operating on a shoe, mechanism for feeding the shoe, guiding devices acting along a contour of the shoe, mechanism acting automatically to relatively shift the guiding devices and operating means transversely of the feed during a predetermined part of the travel of the operating means about the shoe to progressively vary its path of travel with relation to the guiding contour, substantially as described.

2. A machine for operating upon shoes, having, in combination, means for operating on a shoe sole, a guide for the shoe, mechanism for feeding the shoe, and mechanism acting automatically to relatively shift the guide and operating means transversely of the feed during a predetermined portion of the travel of the operating means about the shoe to progressively vary the distance of its path of travel from the inseam, substantially as described.

3. A machine for operating upon shoes, having, in combination, means for operating on a shoe, a shoe supporting jack, mechanism for feeding the shoe, guiding devices acting along a contour of the shoe, mechanism for relatively moving the jack and operating means to maintain them in proper relation during the transfer of the point of operation about the shoe, and mechanism for relatively moving the guiding devices and operating means to progressively vary the path of travel of the operating means with relation to the guiding contour, substantially as described.

4. A machine for operating upon shoes, having in combination, means for operating on a shoe, a shoe supporting jack, a guide for engaging and guiding the shoe, mechanism for swinging the jack, a feeler acting along the contour engaged by the guide for controlling the swinging movements of the jack mounted for movement with the guide and means for moving the guide to vary the path of travel of the operating means, substantially as described.

5. A machine for operating upon shoes, having in combination, a sole trimming knife guiding devices acting along a contour of the shoe and mechanism acting automatically to feed the shoe and to relatively move the guiding devices and knife to vary the width of the projecting edge of the sole at predetermined times during the trimming of the sole, substantially as described.

6. A machine for operating upon shoes, having in combination, means for operating on a shoe, a jack for supporting the shoe and presenting it to the operating means, guiding devices acting along a contour of the shoe mechanism for feeding the shoe and mechanism acting automatically to relatively move the guiding devices and operating means progressively at predetermined times during the feed to vary the path of travel of the operating means with relation to the guiding contour, substantially as described.

7. A machine for operating upon shoes, having in combination, a knife for operating on a shoe sole, a jack for supporting the shoe and presenting it to the knife, guiding devices acting along a contour of the shoe, means for feeding the shoe and mechanism acting automatically to relatively move the guiding devices and knife during the feed to vary the path of travel of the knife with relation to the guiding contour, substantially as described.

8. A machine for operating upon shoes, having in combination, a sole trimming knife, a channeling knife, a jack for supporting the shoe and presenting it to the knives, guiding devices acting along a contour of the shoe, mechanism for feeding the shoe and mechanism acting automatically to relatively move the guiding devices and knives during the feed to vary the path of travel of the knives with relation to the guiding contour, substantially as described.

9. A machine for operating upon shoes, having in combination, a sole trimming knife, a channeling knife, a jack for supporting the shoe and presenting it to the knives, guiding devices acting along a contour of the shoe, mechanism for feeding the shoe and mechanism acting automatically to relatively move the knives during the feed to vary the distance of the channel from the edge of the sole, substantially as described.

10. A machine for operating upon shoes, having in combination, a rounding and channeling mechanism including trimming and channeling knives, a shoe supporting jack and automatically operating mechanism for tipping the channeling and rounding mechanism transversely and longitudinally and for swinging the jack, substantially as described.

11. A machine for operating upon shoes, having in combination, a channeling and rounding mechanism comprising trimming and channeling knives and a guide for acting along a contour of the shoe, mechanism for tilting the channeling and rounding mechanism in accordance with the lateral and longitudinal curvature of the sole and mechanism for swinging the jack in accordance with the curvature of the contour engaged by the guide, substantially as described.

12. A machine for operating upon shoes, having, in combination, a channeling and rounding mechanism comprising trimming and channeling knives, a shoe supporting jack, and automatically operating mechanism for relatively tipping the jack and the channeling and rounding mechanism transversely and longitudinally and for swinging the jack, substantially as described.

13. A machine for operating upon shoes, having in combination, means for operating on a shoe, a guide acting along a lateral contour of the shoe, a shoe supporting jack, mechanism for intermittently swinging the jack and means for drawing the shoe laterally against the guide between the swinging movements, substantially as described.

14. A machine for operating upon shoes, having in combination, means for operating on a shoe sole, a shoe supporting jack, means for feeding the shoe, mechanism for relatively moving the shoe and operating means transversely of the feed to vary the distance of the point of operation from the inseam including a pattern cam and devices for intermittently actuating the cam comprising a series of tripping devices moving with the jack, substantially as described.

15. A machine for operating upon shoes, having in combination, means for operating on a shoe, a shoe supporting jack, means for feeding the shoe, a guide for engaging and guiding the shoe and means operating upon the jack to intermittently draw the shoe laterally against the guide, substantially as described.

16. A machine for operating upon shoes, having in combination, means for operating on a shoe, a shoe supporting jack, means for feeding the shoe, a guide, mechanism for automatically swinging the jack and intermittently operating devices for drawing the shoe laterally against the guide and releasing it during the feed of the shoe and swinging of the jack, substantially as described.

17. A machine for operating upon shoes, having in combination, means for operating upon a shoe, a shoe supporting jack, means for feeding the shoe, a guide for engaging and guiding the shoe, a feeler mounted to move transversely with the guide and to move relatively thereto and arranged to engage the shoe in advance of the guide and mechanism controlled by the feeler for swinging the jack to keep the shoe against the guide, substantially as described.

18. A machine for operating upon shoes, having in combination, means for operating on a shoe, a shoe supporting jack, means for feeding the shoe, a guide for engaging and guiding the shoe, a feeler mounted on the guide and arranged to engage the shoe in advance of the guide and jack swinging mechanism controlled by the feeler, substantially as described.

19. A machine for operating upon shoes, having in combination, means for operating on a shoe sole, a jack, mechanism for relatively moving the jack and operating means transversely of the feed to vary the distance of the point of operation from the inseam, a controller provided with a series of trips acting successively as the shoe is fed to throw said mechanism into operation, and connections between the controller and said mechanism, substantially as described.

20. A machine for operating upon shoes, having, in combination, means for operating on a shoe, a shoe supporting jack, a guide for engaging and guiding the shoe, mechanism for swinging the jack, a feeler acting along a contour of the shoe for controlling the swinging movements of the jack mounted for movement with the guide, and means for moving the guide to vary the path of travel of the operating means, substantially as described.

ERASTUS E. WINKLEY.

Witnesses:
C. E. SNOW,
MABEL ACKROYD.